United States Patent
Tang

(10) Patent No.: US 8,121,076 B2
(45) Date of Patent: Feb. 21, 2012

(54) NETWORK LISTENING METHOD OF A MOBILE PHONE

(75) Inventor: Jun Tang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 293 days.

(21) Appl. No.: 12/648,076

(22) Filed: Dec. 28, 2009

(65) Prior Publication Data

US 2011/0003618 A1  Jan. 6, 2011

(51) Int. Cl.
*H04W 4/00* (2009.01)
(52) U.S. Cl. .......................... 370/328; 370/342; 370/441
(58) Field of Classification Search .................. None
See application file for complete search history.

(56) References Cited

U.S. PATENT DOCUMENTS

| | | | |
|---|---|---|---|
| 7,177,658 B2* | 2/2007 | Willenegger et al. | 455/522 |
| 7,583,977 B2* | 9/2009 | Willenegger et al. | 455/522 |
| 2007/0220498 A1* | 9/2007 | Madsen | 717/140 |
| 2010/0150103 A1* | 6/2010 | Womack et al. | 370/331 |
| 2010/0246479 A1* | 9/2010 | Deu-Ngoc et al. | 370/328 |

* cited by examiner

*Primary Examiner* — Bob Phunkulh
(74) *Attorney, Agent, or Firm* — Altis Law Group, Inc.

(57) ABSTRACT

A mobile phone includes a code division multiple access (CDMA) chip and a first user identity module (UIM) card. A network listening method of the mobile phone burns identification information of a second UIM card into the mobile phone, and executes a first network listening method to listen to a communication network, if a first listening frequency equals to a second listening frequency and a first listening channel equals to a second listening channel. The network listening method further executes a second network listening method to listen to the communication network, if the first listening frequency does not equal to the second listening frequency and/or the first listening channel does not equal to the second listening channel.

13 Claims, 5 Drawing Sheets

NETWORK LISTENING METHOD OF A MOBILE PHONE

BACKGROUND

1. Technical Field

Embodiments of the present disclosure relate generally to communication methods of mobile phones, and more particularly to a network listening method of a mobile phone having a single code division multiple access (CDMA) chip.

2. Description of Related Art

Generally, a user identity module (UIM) is a card used in a mobile phone. The UIM card may include a microprocessor and a memory chip. Information, such as telephone numbers and network numbers, are usually stored in the memory chip of the UIM card. Therefore, the mobile phone may be provided with a call service by mounting the UIM card to another mobile phone which supports a UIM interface.

A mobile phone may include one or more CDMA chips, such as a single CDMA mobile phone or a dual CDMA mobile phone. However, the mobile phone should include two CDMA chips to adapt for two UIM cards so as to use a dual-mode function of the mobile phone. Therefore, the practicability of the dual-mode function of the CDMA mobile phone is limited.

What is needed, therefore, is an improved network listening method used in a mobile phone having a single CDMA chip, a signal UIM card, and a virtual UIM card.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
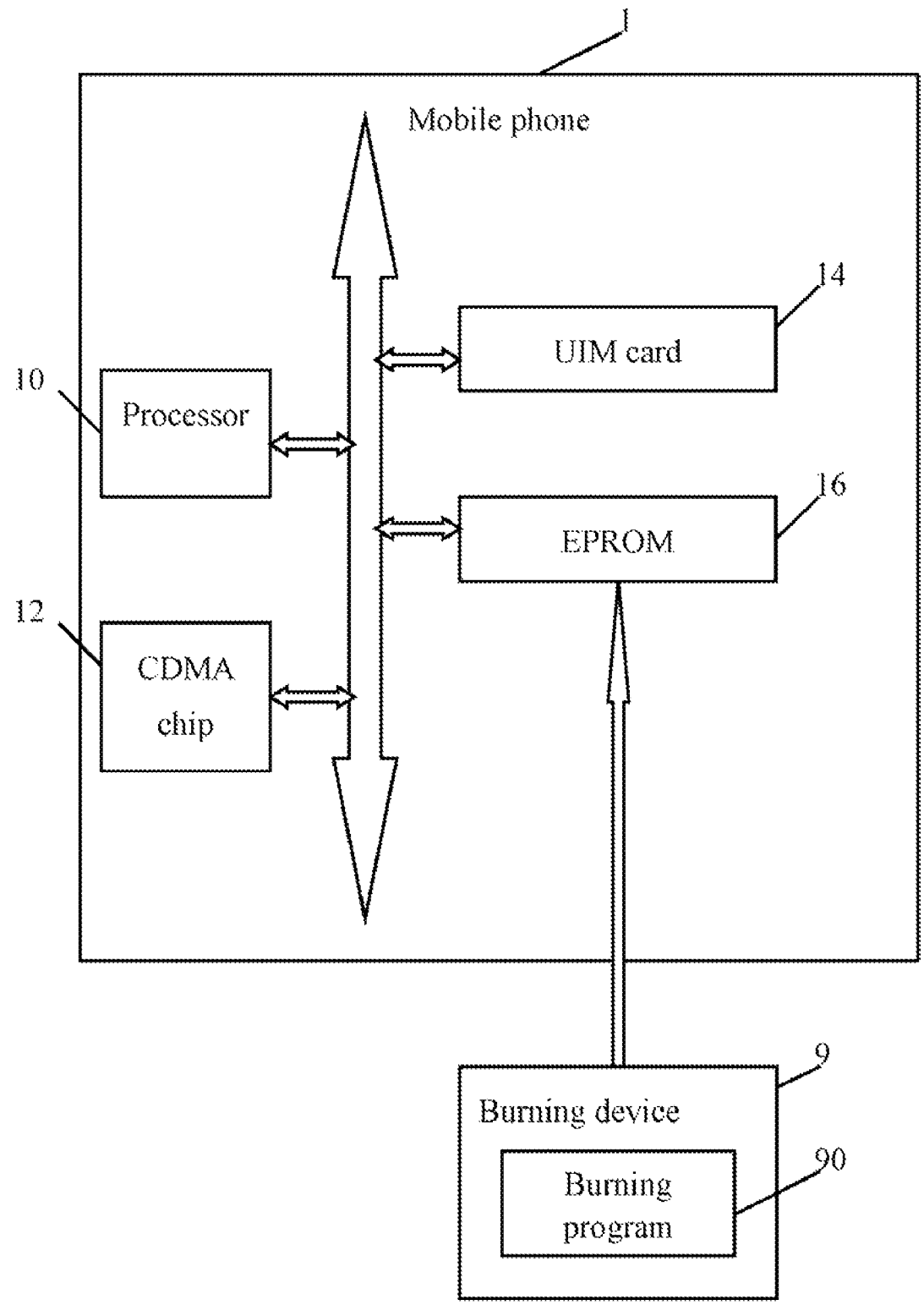
FIG. 1 is a block diagram of one embodiment of a mobile phone in communication with a burning device.

FIG. 1 is a block diagram of one embodiment of a mobile phone 1 in communication with a burning device 9. In one embodiment, the mobile phone 1 includes a code division multiple access (CDMA) chip 12, and a user identity module (UIM) card 14. The UIM card 14 may include a microprocessor and a memory chip. The memory chip may be used to store various information, such as a contact list, and network numbers, for example.

The mobile phone 1 also includes a processor 10 and an electrically programmable read-only-memory (EPROM) 16. The EPROM 16 may store various information, such as phone numbers, communication records, for example. The processor 10 executes one or more computerized operations of the mobile phone 1 and other applications, to provide the functions of the mobile phone 1.

The burning device 9 has a burning program 90. The burning device 9 may be used to burn information into different mediums. In one embodiment, the burning device 9 may be connected to the mobile phone 1 through a universal serial bus (USB) cable, and burn identification information of another UIM card (hereinafter referred to as "second UIM card") into the EPROM 16 of the mobile phone 1 using the burning program 90. The second UIM card is not embedded in the mobile phone. That is, the burning device 9 is able to read the second UIM card and replicate information of the second UIM card in the EPROM 16, thereby yielding a virtual second UIM card in the EPROM 16.

In one embodiment, the identification information of the second UIM card may include, but are not limited to, a 32-bit electronic serial number (ESN) or a 56-bit mobile equipment identifier (MEID), and 64-bit authentication key (A-Key). ESN is a permanent 32-bit number embedded by a manufacturer that uniquely identifies a wireless communications device (e.g., a mobile phone). MEID is an ID number that is globally unique for each CDMA mobile phone in the world. MEID identifies the CDMA mobile phone to the communication network. MEID is a replacement for ESN. The A-key is used in many CDMA networks in authentication process.

As a result, the mobile phone 1 has a physical UIM card (e.g., the UIM card 14) and a virtual second UIM card. In one embodiment, the burned identification information of the virtual second UIM card is different from identification information of the UIM card 14. By using the CDMA chip 12, the UIM card 14, and the virtual second UIM card, the mobile phone 1 may have a dual-card function without the need of two CDMA chips or two physical UIM cards. Details of these operations will be provided below.

Figure 2:
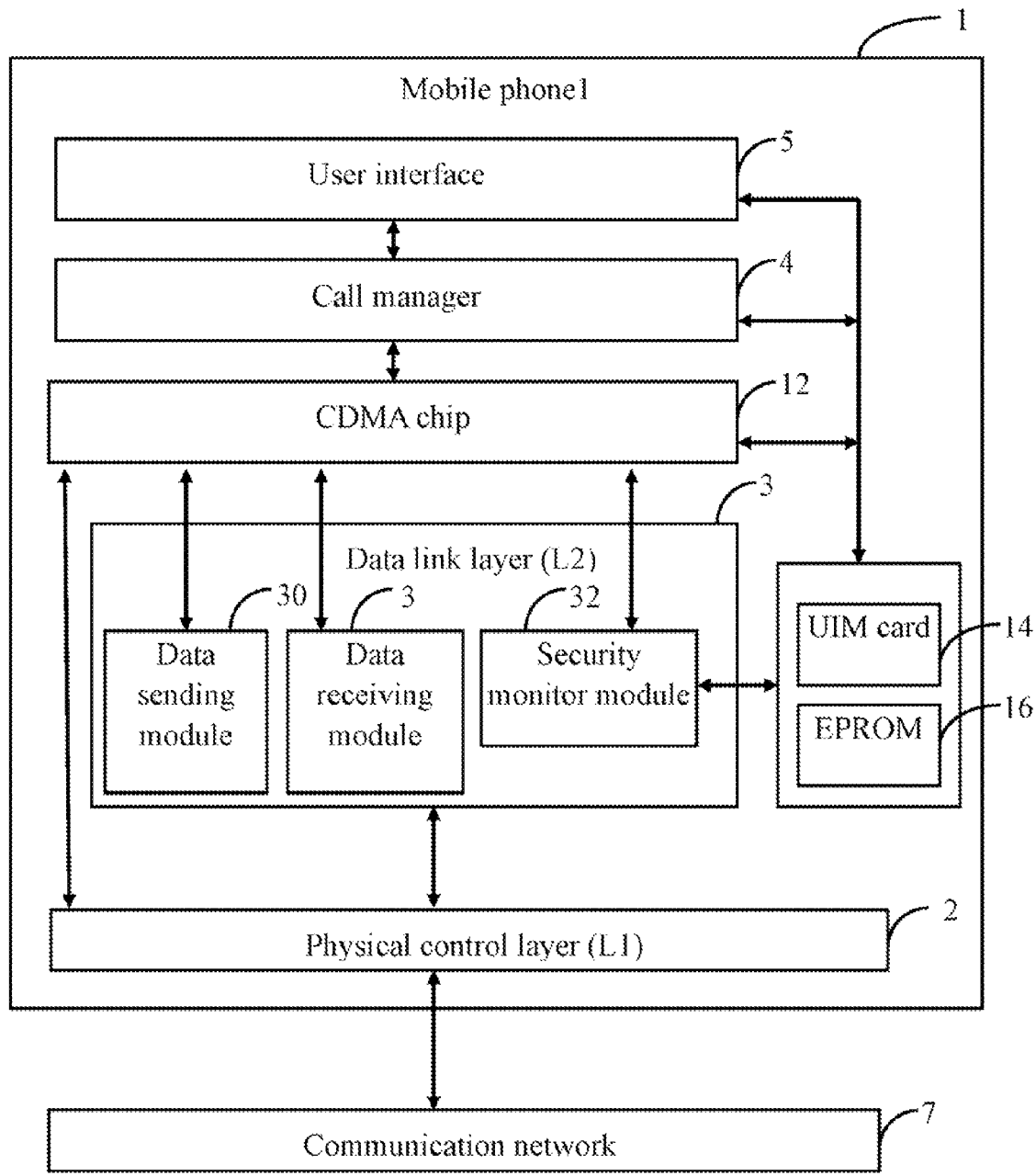
FIG. 2 is a block diagram of one embodiment of the mobile phone of FIG. 1.

FIG. 2 is a second block diagram of one embodiment of a mobile phone 1. In one embodiment, the mobile phone 1 may further include a physical control layer 2, a data link layer 3, a call manager 4, and a user interface (UI) 5. The physical control layer 2 connects to the data link layer 3 and the CDMA chip 12, each of which can exchange communication data therein. The call manager 4 connects to the CDMA chip 12 and the user interface 5, and manages an incoming or outgoing call of the mobile phone 1.

The physical control layer 2 provides a physical interface for controlling the data link layer 3 to communicate with the CDMA chip 12. For example, if the mobile phone 1 receives a call from a communication network 7, the physical control layer 2 receives communication data (e.g., audio signals) from the communication network 7, and transfers the communication data to the CDMA chip 12. After the CDMA chip 12 processes the communication data, the physical control layer 2 transmits the processed data to the communication network 7.

The data link layer 3 may includes a data sending module 31, a data receiving module 32, and a security monitor module 33. Each of the function modules 31-33 may comprise one or more computerized codes to be executed by the CDMA chip 12 of the mobile phone 1. Details of these operations will be provided below.

The data sending module 31 sends the processed data to the communication network 7 via the physical control layer 2. The data receiving module 32 receives the communication data from the communication network 7 through the physical control layer 2. The security monitor module 33 connects to the UIM card 14 and the EPROM 16, and authorizes user identification of the mobile phone 1 to log in the communication network 7.

The CDMA chip 12 processes the communication data transmitted from the data link layer 3, and records network listening parameters in the UIM card 14 and the EPROM 16. In one embodiment, the network listening parameters may include a listening frequency, a listening channel, and a listening duration when the mobile phone 1 listens to the communication network 7 using the UIM card 14 or the virtual second UIM card. For example, when the UIM card 14 listens to the communication network 7, the CDMA chip 12 records the listening frequency (e.g., 12000 Hz) to the UIM card 14, and the listening channel (e.g., No. 2 listening channel) to the UIM card 14. After the UIM card 14 logs in the communication network 7, the CDMA chip 12 calculates the listening duration (e.g., 5 seconds) for the UIM card 14, and then records the listening duration in the UIM card 14.

Figure 3:
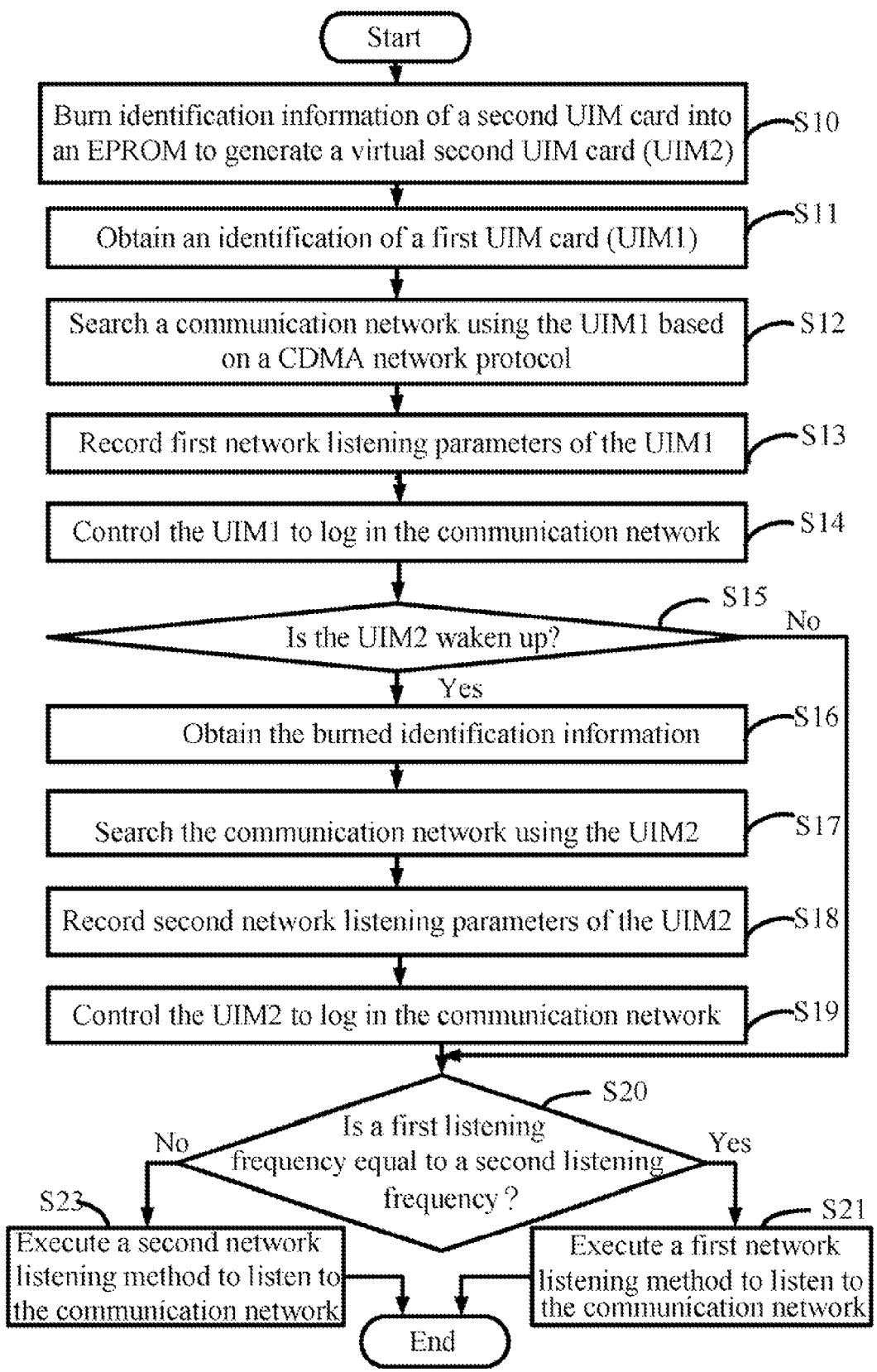
FIG. 3 is a flowchart of one embodiment of a network listening method by using the mobile phone of FIG. 1.

FIG. 3 is a flowchart of one embodiment of a network listening method by using the mobile phone 1, for example, that of FIG. 1. Depending on the embodiment, additional blocks may be added, others removed, and the ordering of blocks may be changed.

In block S10, the burning device 9 burns the identification information of the second UIM card into the EPROM 16 of the mobile phone 1 via the burning program 90, thereby yielding a virtual second UIM card in the EPROM 16. As mentioned above, the second UIM card is not embedded in the mobile phone 1.

In block S11, the physical control layer 2 obtains an identification of the UIM card 14. It is assumed that the mobile phone 1 initially adopts the UIM card 14 to listen to the communication network 7. In block S12, the physical control layer 2 searches the communication network 7 based on a CDMA network protocol by using the UIM card 14. In block S13, the CDMA chip 12 records first network listening parameters of the UIM card 14. As mentioned above, the network listening parameters include a first listening frequency, a first listening channel, and a first listening duration when the UIM card 14 listens to the communication network 7. In block S14, the CDMA chip 12 controls the UIM card 14 to log in the communication network 7 according to the first network listening parameters of the UIM card 14.

In block S15, the CDMA chip 12 determines if the virtual second UIM card is in an active state or a sleep state. If the virtual second UIM card is in an active state, in block S16, the physical control layer 2 obtains the burned identification information of the virtual second UIM card. If the virtual second UIM card is in a sleep state, the procedure goes to block S20 as described below.

In block S17, the physical control layer 2 searches the communication network 7 based on the CDMA network protocol using the virtual second UIM card.

In block S18, the CDMA chip 12 records the second network listening parameters of the virtual second UIM card. The second network listening parameters comprising a second listening frequency, a second listening channel, and a second listening duration.

In block S19, the CDMA chip 12 controls the virtual second UIM card to log in the communication network 7 according to the second network listening parameters.

In block S20, the CDMA chip 12 determines if the first listening frequency of the UIM card 14 equals to the second listening frequency of the virtual second UIM card, and determines if the first listening channel of the UIM card 14 equals to the second listening channel of the virtual second UIM card.

If the first listening frequency of the UIM card 14 equals to the second listening frequency of the virtual second UIM card, and the first listening channel of the UIM card 14 equals to the second listening channel of the virtual second UIM card, in block S21, the CDMA chip 12 executes a first network listening method to listen to the communication network 7. Details of the first network listening method are described as shown in FIG. 4 below.

Figure 5:
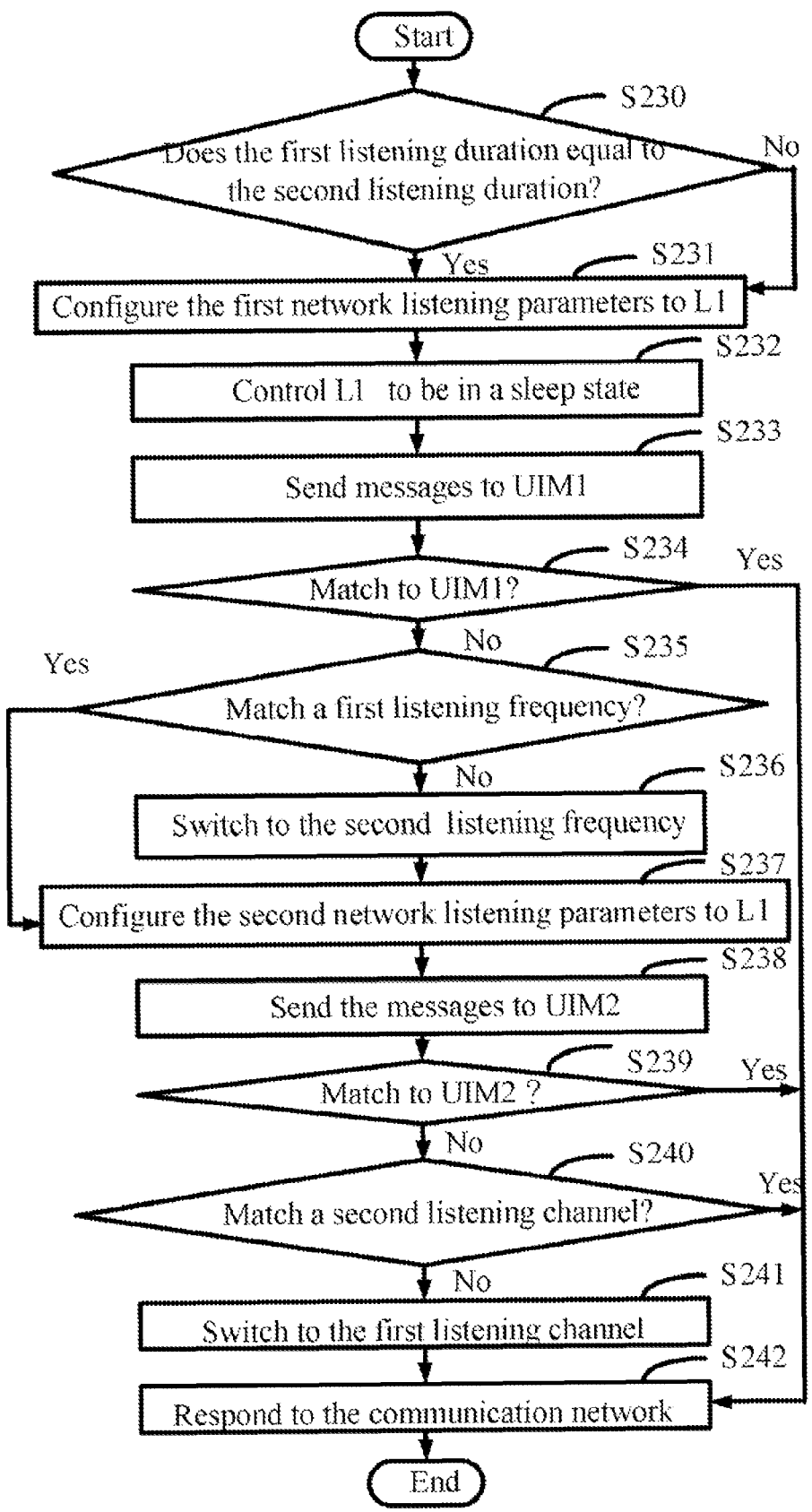
FIG. 5 is a flowchart of detailed descriptions of S23 in FIG. 3.

If the first listening frequency of the UIM card 14 does not equal to the second listening frequency of the virtual second UIM card, and/or the first listening channel of the UIM card 14 does not equal to the second listening channel of the virtual second UIM card, in block S23, the CDMA chip 12 executes a second network listening method to listen to the communication network 7. Details of the second network listening method are described as shown in FIG. 5 below.

Figure 4:
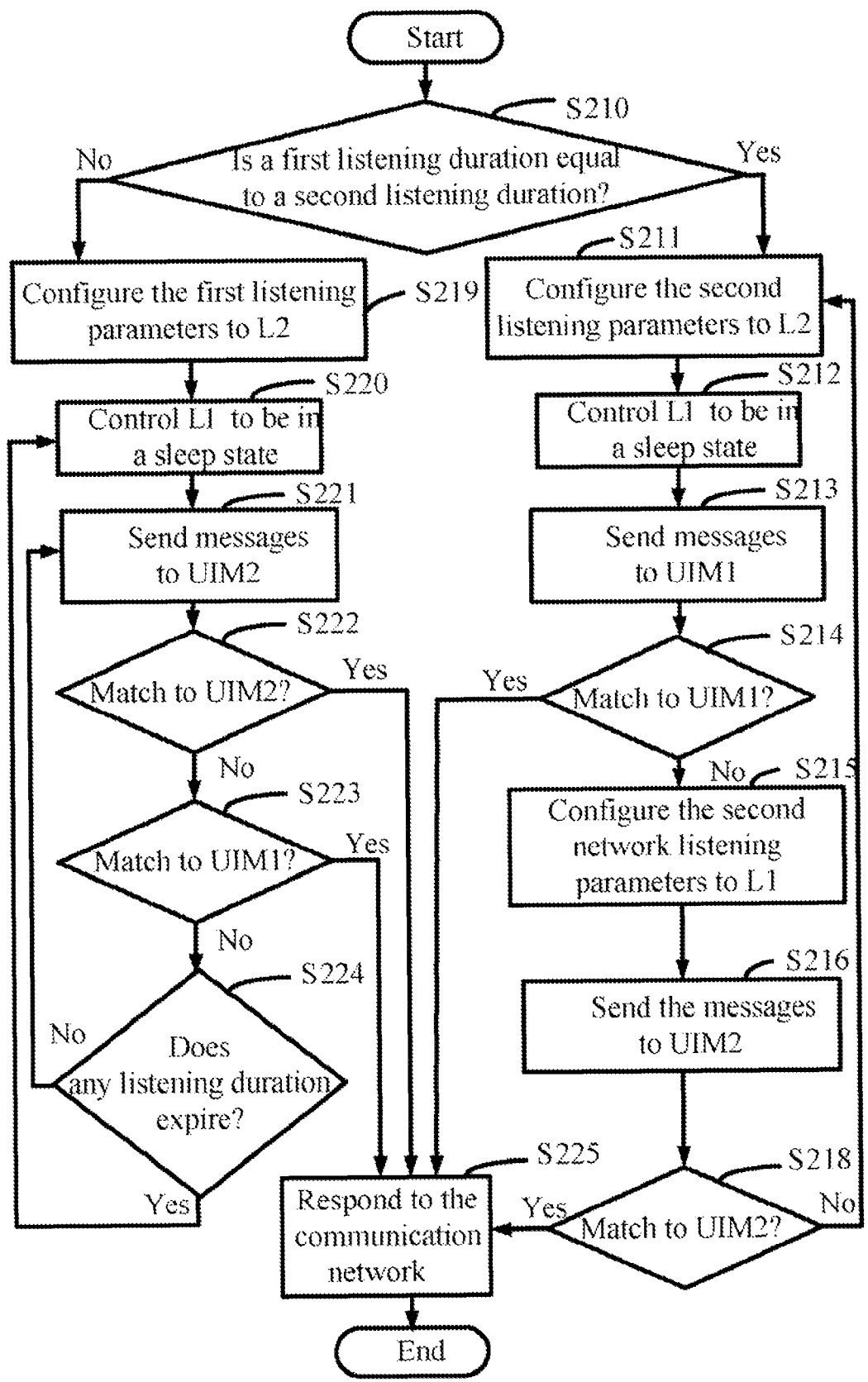
FIG. 4 is a flowchart of detailed descriptions of S21 in FIG. 3.

FIG. 4 is a flowchart of detailed descriptions of S21 in FIG. 3. Depending on the embodiment, additional blocks may be added, others removed, and the ordering of blocks may be changed.

In block S210, the CDMA chip 12 determines if the first listening duration of the UIM card 14 equals to the second listening duration of the virtual second UIM card. If the first listening duration of the UIM card 14 equals to the second listening duration of the virtual second UIM card, the procedure goes to block S211 as described below. If the first listening duration of the UIM card 14 does not equal to the second listening duration of the virtual second UIM card, the procedure goes to block S219 as described below.

In block S211, the CDMA chip 12 configures the first network listening parameters of the UIM card 14 to the physical control layer 2. In block S212, the CDMA chip 12 controls the physical control layer 2 to be in a sleep state to wait for messages from the communication network 7.

In block S213, the physical control layer 2 sends the messages received from the communication network 7 to the UIM card 14. In block S213, the CDMA chip 12 determines if the messages match the UIM card 14 according to the listening parameters. If the messages match the UIM card 14, the procedure goes to block S225 as described below. If the messages do not match the UIM card 14, in block S215, the CDMA chip 12 configures the second network listening parameters of the virtual second UIM card to the physical control layer 2.

In block S216, the physical control layer 2 sends the messages to the virtual second UIM card. In block S218, the CDMA chip 12 determines if the messages match the virtual second UIM card according to the second listening parameters. If the messages match the virtual second UIM card, the procedure goes to block S225 as described below. If the messages do not match the virtual second UIM card, the procedure returns to block S211 as described above.

In block S219, the CDMA chip 12 configures the second network listening parameters of the virtual second UIM card to the physical control layer 2. In block S220, the CDMA chip 12 controls the physical control layer 2 to be in a sleep state to wait for messages from the communication network 7. In block S221, the physical control layer 2 sends the messages received from the communication network 7 to the virtual second UIM card.

In block S222, the CDMA chip 12 determines if the messages match the virtual second UIM card according to the second listening parameters. If the messages match the virtual second UIM card, the procedure goes to block S225 as described below. Otherwise, if the messages do not match the virtual second UIM card, in block S223, the CDMA chip 12 determines if the messages match the UIM card 14 according to the first listening parameters.

If the messages match the UIM card 14, the procedure goes to block S225 as described below. Otherwise, if the messages do not match the UIM card 14, in block S224, the CDMA chip 12 determines if the first listening duration of the UIM card 14 and the second listening duration of the virtual second UIM card expire. If the first listening duration and the second listening duration expire, the procedure returns to block S220 as described above. If the first listening duration or the second listening duration does not expire, the procedure returns to block S221.

As described in block S216, S218, S222, and S223, if the messages match either the UIM card 14 or the virtual second UIM card, in block S225, the CDMA chip 12 responds to the communication network 7 by using the UIM card 14 or the virtual second UIM card.

FIG. 5 is a flowchart of detailed descriptions of S23 in FIG. 3. Depending on the embodiment, additional blocks may be added, others removed, and the ordering of blocks may be changed.

In block S230, the CDMA chip 12 determines if the first listening duration of the UIM card 14 equals to the second listening duration of the virtual second UIM card.

If the first listening duration of the UIM card 14 equals to the second listening duration of the virtual second UIM card, in block S231, the CDMA chip 12 configures the first network listening parameters of the UIM card 14 to the physical control layer 2.

If the first listening duration of the UIM card 14 does not equal to the second listening duration of the virtual second UIM card, the procedure also goes to block S231 as described above.

In block S232, the CDMA chip 12 controls the physical control layer 2 to be in a sleep state to wait for receiving messages from the communication network 7. In block S233, the CDMA chip 12 sends the messages received from the communication network 7 to the UIM card 14.

In block S234, the CDMA chip 12 determines if the messages match the UIM card 14 according to the first listening parameters. If the messages match the UIM card 14, in block S242, the CDMA chip 12 responds to the communication network 7 by using the UIM card 14. Otherwise, if the messages do not match the UIM card 14, in block S235, the CDMA chip 12 determines if the communication frequency equals to the first listening frequency of the UIM card 14.

If the communication frequency does not equal to the first listening frequency of the UIM card 14, in block S236, the CDMA chip 12 switches the communication frequency to the second listening frequency of the virtual second UIM card. Otherwise, if the communication frequency equals to the first listening frequency of the UIM card 14, the procedure goes to block S237 as described below.

In block S237, the CDMA chip 12 configures the second network listening parameters of the virtual second UIM card to the physical control layer 2. In block S238, the CDMA chip 12 sends the messages to the virtual second UIM card.

In block S239, the CDMA chip 12 determines if the messages match the virtual second UIM card according to the second listening parameters. If the messages match the virtual second UIM card, in block S242, the CDMA chip 12 responds to the communication network 7 by using the virtual second UIM card. Otherwise, if the messages do not match the virtual second UIM card, in block S240, the CDMA chip 12 determines if the communication channel matches the second listening channel of the virtual second UIM card.

If the communication channel does not match the second listening channel of the virtual second UIM card, in block S241, the CDMA chip 12 switches the communication channel to the first listening channel of the UIM card 14. Otherwise, if the communication channel matches the second listening channel of the virtual second UIM card, in block S242, the CDMA chip 12 responds to the communication network 7 by using the virtual second UIM card.

As described in block S230, if the first listening duration of the UIM card 14 equals to the second listening duration of the virtual second UIM card, the first listening frequency and the first listening channel of the UIM card 14 are switched to the second listening frequency and the second listening channel of the virtual second UIM card in a period of the listening duration.

If the first listening duration of the UIM card 14 does not equal to the second listening duration of the virtual second UIM card, the first listening frequency and the first listening channel of the UIM card 14 are switched to the second listening frequency and the second listening channel of the virtual second UIM card in two periods of the listening duration.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A network listening method of a mobile phone comprising a code division multiple access (CDMA) chip, an electrically programmable read-only-memory (EPROM) chip, and a first user identity module (UIM) card, the network listening method comprising:

burning identification information of a second UIM card into the EPROM to generate a virtual second UIM card, the second UIM card being not embedded in the mobile phone;

obtaining an identification of the first UIM card using a physical control layer of the mobile phone;

searching a communication network based on a CDMA network protocol using the first UIM card;

recording first network listening parameters of the first UIM card, the first network listening parameters comprising a first listening frequency, a first listening channel, and a first listening duration;

controlling the first UIM card to log in the communication network according to the first network listening parameters;

obtaining the burned identification information of the virtual second UIM card using the physical control layer;

searching the communication network based on the CDMA network protocol according to the burned identification information;

recording second network listening parameters, the second network listening parameters comprising a second listening frequency, a second listening channel, and a second listening duration;

controlling the mobile phone to log in the communication network according to the second network listening parameters;

determining if the first listening frequency equals to the second listening frequency, and if the first listening channel equals to the second listening channel; and executing a first network listening method to listen to the communication network, if the first listening frequency equals to the second listening frequency, and the first listening channel equals to the second listening channel; or executing a second network listening method to listen to the communication network, if the first listening frequency does not equal to the second listening frequency, and/or the first listening channel does not equal to the second listening channel.

2. The network listening method according to claim 1, wherein the first network listening method comprises:

determining if the first listening duration equals to the second listening duration;

in response to the first listening duration equaling to the second listening duration, executing the following steps of:

(a1) configuring the first network listening parameters to the physical control layer;

(a2) controlling the physical control layer to be in a sleep state;

(a3) receiving messages from the communication network to wake up the physical control layer, and determining if the messages match the first UIM card according to the first listening parameters;

(a4) responding to the communication network using the first UIM card if the messages match the first UIM card, or configuring the second network listening parameters to the physical control layer if the messages do not match the first UIM card;

(a5) determining if the messages match the virtual second UIM card according to the second listening parameters; and (a6) responding to the communication network according to the burned identification information if the messages match the virtual second UIM card, or repeating step (a1) to step (a5) if the messages do not match the virtual second UIM card.

3. The network listening method according to claim 2, further comprising:

in response to the first listening duration not equaling to the second listening duration, executing the following steps of:

(b1) configuring the second network listening parameters to the physical control layer;

(b2) controlling the physical control layer to be in a sleep state;

(b3) receiving messages from the communication network to wake up the physical control layer, and determining if the messages match the virtual second UIM card according to the second listening parameters;

(b4) responding to the communication network using the burned identification information if the messages match the virtual second UIM card, or configuring the first network listening parameters to the physical control layer if the messages do not match the virtual second UIM card;

(b5) determining if the messages match the first UIM card according to the first listening parameters;

(b6) responding to the communication network using the first UIM card if the messages match the first UIM card, or determining if the first listening duration and the second listening duration expire if the messages do not match the first UIM card; and (b7) repeating block (b2) to block (b6) if the first listening duration and the second listening duration expire, or repeating block (b3) to block (b6) if the first listening duration and the second listening duration do not expire.

4. The network listening method according to claim 1, wherein the second network listening method comprises:

(S1) determining if the first listening duration of the first UIM card equals to the second listening duration;

(S2) configuring the first network listening parameters of the first UIM card to the physical control layer if the first listening duration equals to the second listening duration;

(S3) controlling the physical control layer to be in a sleep state;

(S4) receiving messages from the communication network by the first UIM card, and determining if the messages match the first UIM card according to the first listening parameters;

(S5) responding to the communication network using the first UIM card if the messages match the first UIM card, or determining if a communication frequency of the communication network equals to the first listening frequency if the messages do not match the first UIM card;

(S6) switching the communication frequency to the second listening frequency if the communication frequency does not equal to the first listening frequency, or configuring the second network listening parameters to the physical control layer if the communication frequency equals to the first listening frequency;

(S7) receiving messages from the communication network by the virtual second UIM card, and determining if the messages match the virtual second UIM card according to the second listening parameters;

(S8) responding to the communication network according to the burned identification information if the messages match the virtual second UIM card, or determining if the communication channel matches the second listening channel if the messages do not match the virtual second UIM card; and (S9) responding to the communication network according to the burned identification information if the communication channel matches the second listening channel, or switching the communication channel to the first listening channel and responding to the communication network using the first UIM card if the communication channel does not match the second listening channel.

5. The network listening method according to claim 4, wherein the first listening frequency and the first listening channel of the first UIM card are switched to the second listening frequency and the second listening channel of the virtual second UIM card in a period of the first listening duration of the first UIM card, if the first listening duration equals to the second listening duration.

6. The network listening method according to claim 4, further comprising:

executing step (S2) to step (S9) if the first listening duration does not equal to the second listening duration.

7. The network listening method according to claim 6, wherein the first listening frequency and the first listening channel of the first UIM card are switched to the second listening frequency and the second listening channel of the virtual second UIM card in two periods of the first listening duration of the first UIM card, if the first listening duration doe not equal to the second listening duration.

8. A network listening method of a mobile phone comprising a code division multiple access (CDMA) chip, an electrically programmable read-only-memory (EPROM) chip, and a first user identity module (UIM) card, the network listening method comprising:

burning identification information of a second UIM card into the EPROM to generate a virtual second UIM card, the second UIM card being not embedded in the mobile phone;

searching a communication network based on a CDMA network protocol using the first UIM card when the first UIM card is wakened up;

recording first network listening parameters of the first UIM card in the CDMA chip, the first network listening parameters comprising a first listening frequency, a first listening channel, and a first listening duration;

determining if a communication frequency of the communication network equals to the first listening frequency;

determining whether a communication channel of the communication network matches the first listening channel if the communication frequency equals to the first listening frequency, and responding to the communication network using the first UIM card if the communication channel matches the first listening channel in response to determining that the communication frequency does not equal to the first listening frequency of the first UIM card, or determining that the communication channel does not match the first listening channel, executing the following steps of:

searching a communication network based on the CDMA network protocol using the virtual second UIM card according to the burned identification information;

recording second network listening parameters of the virtual second UIM card in the CDMA chip, the second network listening parameters comprising a second listening frequency, a second listening channel, and a second listening duration;

switching the communication frequency to the second listening frequency of the virtual second UIM card according to the burned identification information; and switching the communication channel to the second listening channel, and responding to the communication network according to the second network listening parameters.

9. The network listening method according to claim 8, wherein the first listening frequency and the first listening channel of the first UIM card are switched to the second listening frequency and the second listening channel of the virtual second UIM card in a period of the first listening duration, if the first listening duration equals to the second listening duration.

10. The network listening method according to claim 8, wherein the first listening frequency and the first listening channel of the first UIM card are switched to the second listening frequency and the second listening channel of the virtual second UIM card in two periods of the first listening duration, if the first listening duration doe not equal to the second listening duration.

11. A non-transitory computer readable medium having stored thereon instructions that, when executed by a code division multiple access (CDMA) chip of a mobile phone, cause the mobile phone to perform network listening method, the method comprising:

burning identification information of a second UIM card into the EPROM to generate a virtual second UIM card, the second UIM card being not embedded in the mobile phone;

searching a communication network based on a CDMA network protocol using the first UIM card when the first UIM card is wakened up;

recording first network listening parameters of the first UIM card in the CDMA chip, the first network listening parameters comprising a first listening frequency, a first listening channel, and a first listening duration; determining if a communication frequency of the communication network equals to the first listening frequency;

determining whether a communication channel of the communication network matches the first listening channel if the communication frequency equals to the first listening frequency, and responding to the communication network using the first UIM card if the communication channel matches the first listening channel in response to determining that the communication frequency does not equal to the first listening frequency of the first UIM card, or determining that the communication channel does not match the first listening channel, executing the following steps of:

searching a communication network based on the CDMA network protocol using the virtual second UIM card according to the burned identification information;

recording second network listening parameters of the virtual second UIM card in the CDMA chip, the second network listening parameters comprising a second listening frequency, a second listening channel, and a second listening duration;

switching the communication frequency to the second listening frequency of the virtual second UIM card according to the burned identification information; and switching the communication channel to the second listening channel, and responding to the communication network according to the second network listening parameters.

12. The medium according to claim 11, wherein the first listening frequency and the first listening channel of the first UIM card are switched to the second listening frequency and the second listening channel of the virtual second UIM card in a period of the first listening duration, if the first listening duration equals to the second listening duration.

13. The medium according to claim 11, wherein the first listening frequency and the first listening channel of the first UIM card are switched to the second listening frequency and the second listening channel of the virtual second UIM card in two periods of the first listening duration, if the first listening duration doe not equal to the second listening duration.

* * * * *